United States Patent [19]

Bargain et al.

[11] 4,104,239

[45] Aug. 1, 1978

[54] ORGANOPOLYSILOXANE COMPOSITIONS TRANSFORMABLE INTO ELASTOMERS WITHOUT USE OF VULCANIZING AGENTS

[75] Inventors: Michel Bargain, Lyon; Robert Lagarde, Feyzin, both of France

[73] Assignee: Rhone-Poulenc Industries, Paris, France

[21] Appl. No.: 774,485

[22] Filed: Mar. 4, 1977

[30] Foreign Application Priority Data

Mar. 5, 1976 [FR] France .................. 76 07043

[51] Int. Cl.$^2$ ............................................. C08L 83/04
[52] U.S. Cl. ........................... 260/37 SB; 528/12; 528/10
[58] Field of Search ........ 260/37 SB, 46.5 G, 448.8 R

[56] References Cited

U.S. PATENT DOCUMENTS

| 3,328,340 | 6/1967 | Vaughn ..................... 260/37 SB |
| 3,565,859 | 2/1971 | Calas et al. ................... 260/46.5 |

FOREIGN PATENT DOCUMENTS 551,803  4/1957  Belgium ................... 260/46.5

*Primary Examiner*—Lewis T. Jacobs
*Attorney, Agent, or Firm*—Bacon & Thomas

[57] ABSTRACT

An organopolysiloxane composition is disclosed which is transformable into elastomers by heating without using any vulcanizing agent. These compositions comprise:

[1] 100 parts by weight of at least one hydroxylated polydiorganosiloxane having a viscosity of between about $2 \cdot 10^5$ and about $80 \cdot 10^6$ cps at 25° C. and containing 0.001 to 0.1% by weight of terminal hydroxy groups per weight of the polysiloxane;

[2] at least 10 parts by weight of silica having a special surface of between about 100 and about 400 m$^2$/g; and

[3] 0.5 to 15 parts by weight of at least one silane of the formula (I)

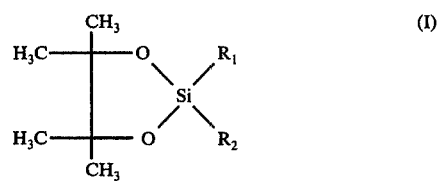

wherein R$_1$ and R$_2$ are the same or different and represent methyl or ethyl.

14 Claims, No Drawings

ORGANOPOLYSILOXANE COMPOSITIONS TRANSFORMABLE INTO ELASTOMERS WITHOUT USE OF VULCANIZING AGENTS

BACKGROUND OF THE INVENTION

1. Field of the Invention

The present invention relates to new organopolysiloxanes which can be transformed into elastomers by heating without using any vulcanizing agent such as peroxides or irradiation.

2. Description of the Prior Art

Elastic organosiloxane products have heretofore been prepared. Historically, only gums, which were obtained by appropriate treatment of diorganosiloxane materials to which different fillers had been added were used as starting materials (see the French Pat. No. 949,361). Yet these elastomers exhibited poor mechanical properties: a maximum elongation of 300%, and a maximum tensile strength of 4.3 kg/cm$^2$. In order to improve the quality of the elastomers and to accelerate the process for their production, vulcanizing agents have been used and reticulation effected (see W. Noll, Chem. and Technology of Silicones, Acad. Press 1968, p. 392).

It is further known (see, B. B. Boonstra et al, Reinforcement of Silicone Rubber by Particulate Silica-Rubber Chemistry and Technology, September/October, 1975, p. 568), that if polysiloxanes which are terminated by hydroxy groups are mixed with a pyrogenic silica, a rapid hardening is to be expected which is caused by reticulation and which renders the products practically unusable. From page 570 of this publication, it is seen that when using an untreated silica, the percentage of the gum which is crosslinked immediately after mixing is very high (83-89%). This percentage can be lessened when pre-treated silica, e.g., silica which is treated with hexamethyl-disilazane, is used, but the mechanical properties of the product are strongly affected by such a treatment.

SUMMARY OF THE INVENTION

It is an object of the present invention to provide new organopolysiloxane compositions which are storage-stable at room temperature.

It is a further object of the present invention to provide such compositions which can be transformed into elastomers by simple heating.

It is a further object of the present invention to provide such compositions which do not require additional vulcanizing agents for their transformation into elastomers.

It is a further object of the present invention to provide such compositions which yield elastomers with excellent mechanical properties, especially with regard to tear strength.

It is a further object of the present invention to provide new silicone elastomers which are suited for manufacturing thick shaped articles, as well as very thin articles.

It is a further object of the present invention to provide new silicone elastomers which are free from peroxide decomposition products.

It is a further object of the present invention to provide such elastomers which are free of bubbles.

It is still a further object of the present invention to provide an economic process for producing silicone elastomers which allows to simplify the conventional mixing operation and to avoid the use of dangerous and expensive materials.

In order to accomplish the foregoing objects according to the present invention there are provided new organopolysiloxane compositions which are transformable into elastomers by heating without using any vulcanizing agent and which yield elastomers with good mechanical properties. These compositions comprise [1] 100 parts by weight of at least one hydroxylated polydiorganosiloxane having a viscosity of between about $2 \cdot 10^5$ and about $80 \cdot 10^6$ cps at 25° C. and containing about 0.001 to 0.1% by weight of terminal hydroxy groups per weight of the polysiloxane, [2] at least 10, preferably between 20 and 100, parts by weight of silica having a specific surface of between about 100 and about 400 m$^2$/g and [3] 0.5 to 15 parts by weight of at least one silane of the formula (I)

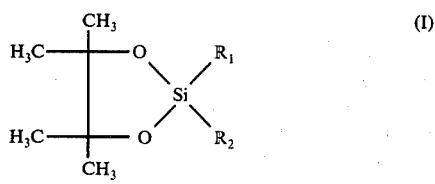

wherein $R_1$ and $R_2$ are the same or different and represent methyl or ethyl.

According to the present invention there is further provided a process for preparing silicone elastomers which comprises the step of heating the above defined composition; also, provided are the silicone elastomers resulting from such process.

DETAILED DESCRIPTION OF THE INVENTION

The hydroxylated polydiorganosiloxanes which are used according to this invention preferably contain between about 0.002 and 0.065% by weight hydroxy groups. They essentially consist of recurring diorganosilozyl units which are the same or different and which correspond to the formula (II)

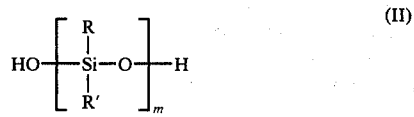

wherein R and R' are the same or different and represent monovalent aliphatic, cycloaliphatic or aromatic groups, preferably lower alkyl or lower alkenyl groups, optionally halo-substituted or CN-substituted, or phenyl, which itself may be halo-substituted, and the number which is represented by $m$ is such that the polydiorganosiloxanes possess the above defined viscosity.

In particular, R and R' may represent methyl, ethyl, vinyl, allyl, trifluoropropyl, cyanopropyl or also phenyl, dichlorophenyl, trichlorophenyl or tetrachlorophenyl.

These polydiorganosiloxanes can be prepared according to conventional processes, especially according to one of the following known methods:

polycondensation of polysiloxanes with terminal hydroxy groups and of low molecular weight by means of a salt of a metal such as zinc, tin, iron, cobalt or by means of an acid such as hydrochloric acid or sulfuric acid, optionally in the presence of a dehydrating agent.

polycondensation of the same polysiloxanes bearing terminal chloro atoms or amino groups in the presence of a base or a salt of an amine.

These polydiorganosiloxanes may contain a relatively small amount of trifunctional groups of the formula

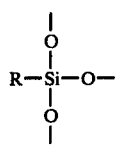

wherein R is as defined above. This amount of trifunctional group is usually less than 0.1% calculated as numbers of silicone atoms belonging to such groups as compared to the total number of silicone atoms.

The compositions according to the present invention further comprise up to 200 parts by weight of fillers per 100 parts of polydiorganosiloxane. These fillers may comprise only pyrogenic or precipitated silica, the specific surface of which is between about 100 and about 400 m²/g. This silica optionally may be treated with organosilicic compounds such as octamethylcyclotetrasiloxane or hexamethyldisilazane as is described in the U.S. Pat. No. 3,037,933 and the British Pat. No. 887,257, the disclosures of which being hereby incorporated by reference. Advantageously, a mixture of treated and untreated silica may be used. Preferably, a composition according to the present invention comprises 20 to 100 parts by weight of silica (untreated or treated silica, or a mixture of both types) per 100 parts by weight of diorganopolysiloxane. Other fillers may also be included in addition to the silica; such fillers are ground quartz, coarser particles of diatomaceous earth, metal oxides or hydroxides such as titanium oxide and oxides and hydroxides of cerium, zinc, manganese and aluminum, asbestos, glass fibers, and carbon black.

The compounds of formula (I), namely, the tetramethylethylenedioxy dimethylsilane, tetramethylethylenedioxy diethylsilane, tetramethylethylenedioxy methylethylsilane, can be prepared according to the method described in the Belgian Patent No. 551,803, the disclosure of which is hereby incorporated by reference.

Any one of these silane compounds, or any admixtures thereof, may be used according to the present invention. Preferably the total amount of silanes of formula (I) is between about 1 and about 6 parts by weight per 100 parts by weight of polydiorganosiloxanes.

The blending of the various components according to the present invention can be performed by conventional means which are known in the rubber and polymer industries. it can be performed under a pressure of between about 1 to about 100 atmospheres or under reduced pressure, optionally in the presence of an inert gas.

The subject compositions can be used immediately upon preparation, or same can be stored for periods of time and eventually thoroughly mixed and then used. It is to be noted that the compositions according to the present invention can be stored for several months at room temperature and none of the reticulation phenomena which are described by Boonstra, supra, is observed during this storage period.

The process of transforming the compositions according to the present invention into silicone elastomers comprises the step of heating any given composition to a temperature of between about 50° and about 450° C., preferably between about 80° and about 350° C., and most preferably between about 150° and 250° C. The heating period may vary between several seconds and several hours, depending upon the different components of the mixture and the heating temperature.

The properties of the elastomers can be improved by subsequent heating, preferably to a temperature of between about 150° and about 250° C. This complementary heating preferably is effected for several hours, e.g., 10 to 20 hours.

The resulting elastomers can be used in all the technical fields and for all applications wherein the known silicone elastomers typically are utilized, and can be utilized over a wide temperature range. The elastomers exhibit excellent mechanical properties, especially with regard to tear resistance.

Furthermore, since no vulcanizing agents such as peroxides are present, the obtained elastomers do not contain any components which originate from peroxide decomposition. Equally, the forming of bubbles and thus their presence in the elastomer is avoided. This permits of the manufacture of thick pieces without any risk of bubbling, as well as very thin pieces without any physical defects.

The absence of any vulcanizing agent during the production of the elastomers according to the present invention offers the further advantage that the operations for preparing the mixture are simplified, and the handling of dangerous and expensive materials is excluded.

The invention will be further illustrated by the following examples. The determinations of the mechanical data have been performed according to recognized standard methods, namely the tear strength has been determined according to the ASTM D 624-48 norm.

EXAMPLE 1

(A) Two identical mixtures were prepared, each weighing about 700 g, by thoroughly mixing the following components in a mixing cylinder at room temperature for one hour:

100 g of hydroxylated polydimethylsiloxane having the following characteristic properties:

| | |
|---|---|
| viscosity: | 8.10⁶ cps |
| medium molecular weight: | 480,000 |
| amount of hydroxyl groups per siloxanes: | 80 mg/kg |

5 g of pyrogenic silicia having a specific surface of 294 m²/g, determined according to the BET method, 45 g of pyrogenic silica which had been treated with octamethylcyclotetrasiloxane (according to the method described in the British Patent No. 887,257) and having a specific surface of 240 m²/g, determined according to the BET method, 2 g of (tetramethylethylenedioxy) dimethylsilane.

One of these mixtures was designated A.

To the other (the comparative sample designated B), 1.5 g of a mixture of 50% of 2,4-dichlorobenzoyl peroxide in an inert polydimethylsiloxane were added. This product is often used as a crosslinking agent in the preparation of silicone elastomers.

The two compositions were submitted to identical treatments, namely heating to 110° C. under a pressure of 67 bars for 8 minutes, and then to 200° C. for 16 hours without pressure.

The results obtained from the mechanical tests with each of the compositions A and B, are shown in the following table:

TABLE I

| Samples | A | B |
|---|---|---|
| Shore hardness A | 65 | 70 |
| Tensile strength (kg/cm$^2$) | 81 | 89 |
| Corresponding elongation (%) | 850 | 360 |
| Tear strength (kg/cm$^2$) | 36 | 16 |
| Resilience Zwick 8 mm | 28 | 41 |

This table shows that the elastomers prepared from the composition A exhibit an improved tear strength, compared to the tear strength of the elastomers from the composition B.

(B) The composition A was compared with a composition (C) which comprises the same components except the (tetramethylethylenedioxy) dimethylsilane. The percentage of the gum which was cross-linked was determined directly after the mixing operation (1 hour at room temperature), and also the changes in the re-plastifying time after storage. From this re-plastifying time, the transformation of the composition and its fitness for immediate use (extrusion, molding) can be estimated. The re-plastifying time was determined in the following manner: 100 g of the composition were mixed in the cold in a mixing cylinder (diameter 150 mm, length 300 mm) wherein the distance between the rolls was 0.3 mm and their speed, 24 turns/minute (in the front) and 16 turns/minute, respectively (in the back). The re-plastifying time is the time at the end of which the mixture passes from the back roll to the front roll. This time should be as short as possible. The following results were obtained:

TABLE II

| | A | C |
|---|---|---|
| Percentage of cured gum (%) directly after mixing | 6 | 25 |
| Re-plastifying time after storage | | |
| at for 1 day | inst.* | 1 min. |
| 25° C. for 3 days | inst. | 3 min/15 sec. |
| for 5 days | inst. | 4 min. |
| for 2 months | 20 sec. | 20 min. |

*instantly = less than 7-8 seconds.

EXAMPLE 2

According to the same method as in Example 1, a composition was prepared which contained:
100 g of hydroxylated polydimethylsiloxane characterized by the following properties:

| viscosity: | 8.10$^6$ cps |
|---|---|
| medium molecular weight: | 480,000 |
| amount of hydroxyl groups per siloxanes: | 80 mg/kg |

35 g of silica (untreated) having a specific surface of 249 m$^2$/g, determined according to the BET method;

45 g of pyrogenic silica treated with octamethylcyclotetrasiloxane according to the method described in the British Pat. No. 887,257, and having a specific surface of 240 m$^2$/g, determined according to the BET method;

5 g of (tetramethylethylenedioxy) dimethylsilane.

After thoroughly mixing, the mixture was heated to 150° C. for 72 hours.

The mechanical properties of the elastomers prepared from this composition were the following:

| Shore hardness A | 74 | |
| Tensile strength | 94 | kg/cm$^2$ |
| Elongation | 660% | |
| Tear strength | 23 | kg/cm$^2$ |
| Resilience Zwick 8 mm | 48 | |

EXAMPLE 3

Compositions were prepared from either the polydimethylsiloxane of Example 1 (siloxane I), or a hydroxylated polydimethylsiloxane having a viscosity of 8·10$^6$ cps at 25° C., a medium molecular weight of 540,000, and containing 60 mg/kg hydroxyl groups (siloxane II).

In the following table, the composition of the mixture, the treatment to which it is subjected, and the properties of the elastomers are indicated.

TABLE III

| Compositions | | | | | | |
|---|---|---|---|---|---|---|
| Hydroxylated polydimethylsiloxane (I) 100 g: | X | X | X | | | |
| Hydroxylated polydimethylsiloxane (II) 100 g: | | | | X | X | X |
| Silica, untreated, of Example I | | | | | | |
| 35 g: | X | | | | | |
| 5 g: | | | | X | | X |
| 15 g: | | X | | | | |
| Silica, treated with octamethyl-cyclotetrasilane, 40 g: | | | X | X | X | X |
| Precipitated silica, 2 g: | | X | | | | X |
| Tetramethylethylenedioxydimethylsilane: | | | | | | |
| 5 g: | X | X | | | | X |
| 6 g: | | | X | X | X | |
| Re-plastifying time after 1 month of storage at 25° C. | 3 mn | 20 s | 15 s | 19 s | 25 s | 20 s |
| Working Conditions | | | | | | |
| Temperatures: | | | | | | |
| 150° C. – 3 days | X | | | | | |
| 200° C. – 16 hours | | X | X | X | X | X |
| Shore hardness A | 74 | 56 | 62 | 55 | 77 | 65 |
| Tensile strength | 94 | 53 | 70 | 80 | 77 | 65 |
| Corresponding elongation | 660 | 730 | 640 | 730 | 550 | 710 |

TABLE III-continued

| Compositions | | | | | | |
|---|---|---|---|---|---|---|
| Tear strength | 29 | 28 | 34 | 42 | 42 | 33 |
| Resilience Zwick 8 mm % | 48 | 32 | 27 | 25 | 29 | 30 |
| Remaining deformation after compression % (70 h/150° C./30%) | 82 | 87 | | | 60 | 50 |

EXAMPLE 4

According to the same method as in Example 1, the following composition was prepared:

100 g of hydroxylated polydimethylsiloxane characterized by the following properties:

| | |
|---|---|
| viscosity (25° C.): | $8.10^6$ cps |
| medium molecular weight: | 480,000 |
| amount of hydroxyl groups: | 80 mg/kg |

40 g of silica treated with octamethylcyclotetrasilane,
5 g of untreated silica,
3 g of (tetramethylethylenedioxy) dimethylsilane.

This composition was subjected to an extrusion operation for 90 minutes in an oven which had been heated to 350° C. with air.

The dimensions of the die were as follows:
outer diameter — 7 mm
inner diameter — 4 mm The resulting tube was without defects, and was easy to handle. After a complementary thermal treatment for 16 hours at 200° C., same displayed the following properties:

| | |
|---|---|
| Shore hardness A | 60 |
| Tensile strength (kg/cm²) | 91 |
| Elongation % | 840 |
| Tear strength (kg/cm) | 37 |

While the invention has now been described in terms of certain preferred embodiments, and exemplified with respect thereto, the skilled artisan will appreciate that various modifications, changes, substitutions, and omissions may be made without departing from the spirit thereof. Accordingly, it is intended that the scope of the present invention be limited solely by the scope of the following claims.

What is claimed is:

1. A storage stable organopolysiloxane composition devoid of a curing agent which is heat curable into elastomers comprising:

[1] 100 parts by weight of at least one hydroxylated polydiorganosiloxane having a viscosity of between about $2 \cdot 10^5$ and about $80 \cdot 10^6$ cps at 25° C. and containing about 0.001 to about 0.1% by weight of terminal hydroxy groups per weight of the polysiloxane;

[2] at least 10 parts by weight of a silica having a specific surface of between about 100 and about 400 m²/g; and,

[3] 0.5 to 15 parts by weight of at least one silane of the formula (I)

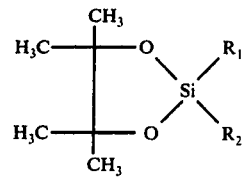

wherein $R_1$ and $R_2$ are the same or different and represent methyl or ethyl.

2. The compositions as defined in claim 1, which comprises about 10 to about 200 parts by weight of the silica.

3. The composition as defined in claim 1, which comprises about 20 to about 100 parts by weight of the silica.

4. The composition as defined in claim 1, which comprises about 1 to about 6 parts by weight of the silane of formula (I).

5. The composition as defined in claim 1, wherein the silica comprises a mixture of untreated silica and silica which has been treated with an organosilicic compound selected from the group consisting of hexamethylcyclotetrasiloxane, octamethylcyclotetrasiloxane and hexamethyldisilazane.

6. A process for preparing organosilicone elastomers which comprises the step of heating the composition as defined in claim 1 to a temperature sufficient to vulcanize said composition.

7. The process as defined in claim 6, wherein the heating step is effected at a temperature of between about 50° and about 450° C.

8. The process as defined in claim 7, wherein the temperature is between about 80° and about 350° C.

9. The process as defined in claim 8, wherein the temperature is between about 150° and 250° C.

10. The process as defined in claim 6, which further comprises a second heating step.

11. The process as defined in claim 10, wherein the second heating step is effected at a temperature of between about 150° and about 250° C.

12. An organopolysiloxane elastomer obtained by the process as defined in claim 6.

13. A shaped article comprising the elastomer as defined in claim 12.

14. A composition as defined in claim 1, essentially consisting of:

[1] 100 parts by weight of at least one hydroxylated polydiorganosiloxane having a viscosity of between about $2 \cdot 10^5$ and about $80 \cdot 10^6$ cps at 25° C. and containing about 0.001 to about 0.1% by weight of terminal hydroxy groups per weight of the polysiloxane;

[2] at least 10 parts by weight of a silica having a specific surface of between about 100 and about 400 m²/g; and

[3] 0.5 to 15 parts by weight of at least one silane of the formula (I)

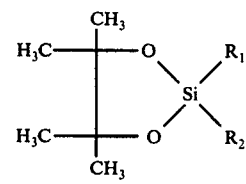

wherein $R_1$ and $R_2$ are the same or different and represent methyl or ethyl.

* * * * *